(12) United States Patent
Nakagawa et al.

(10) Patent No.: US 6,505,661 B1
(45) Date of Patent: Jan. 14, 2003

(54) PNEUMATIC TIRE HAVING WIDE GROOVE HAVING TWO LONGITUDINAL RIBS, INTERMEDIATE RIBS AND LATERAL RIBS

(75) Inventors: Yoshiki Nakagawa, Nishinomiya (JP); Tetsuhiko Yoshioka, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/636,747

(22) Filed: Aug. 11, 2000

(51) Int. Cl.$^7$ .................... B60C 11/13; B60C 101/00
(52) U.S. Cl. .............. 152/209.15; 152/209.18; 152/209.19; 152/209.22; 152/209.26; 152/209.28
(58) Field of Search ............ 152/209.15, 209.18, 152/209.19, 209.22, 209.26, 209.28; 425/812

(56) References Cited

U.S. PATENT DOCUMENTS

| | | | | |
|---|---|---|---|---|
| 1,880,430 A | * | 10/1932 | Furnas | |
| 2,605,807 A | * | 8/1952 | Wittmer | |
| 3,682,220 A | * | 8/1972 | Verdier | |
| 3,727,661 A | * | 4/1973 | Hoke | |
| 5,375,639 A | * | 12/1994 | Suzuki et al. | |
| 5,472,030 A | * | 12/1995 | Shibata et al. | |
| 5,800,642 A | * | 9/1998 | Ohya | |
| 6,021,830 A | * | 2/2000 | Iwamura | |
| 6,302,174 B1 | * | 10/2001 | Suzuki | |

FOREIGN PATENT DOCUMENTS

| | | | |
|---|---|---|---|
| EP | 858915 | * | 8/1998 |
| EP | 950547 | * | 10/1999 |
| JP | 54-69191 | * | 6/1979 |
| JP | 3-139402 | * | 6/1991 |
| JP | 6-99705 | * | 4/1994 |
| JP | 6-143932 | * | 5/1994 |
| WO | WO 95/18022 | * | 7/1995 |

* cited by examiner

*Primary Examiner*—Steven D. Maki
(74) *Attorney, Agent, or Firm*—Birch, Stewart, Kolasch & Birch, LLP (57) ABSTRACT

A pneumatic tire comprises a tread portion provided with a wide groove having a bottom width of not less than 20 mm. The wide groove is provided on the groove bottom with at least one longitudinal rib extending in the longitudinal direction of the wide groove, and lateral ribs extending from the longitudinal rib towards a tread face through the groove bottom and a groove wall of the wide groove, whereby occurrence of bareness of tread rubber in the groove bottom can be prevented.

14 Claims, 8 Drawing Sheets

PNEUMATIC TIRE HAVING WIDE GROOVE HAVING TWO LONGITUDINAL RIBS, INTERMEDIATE RIBS AND LATERAL RIBS

The present invention relates to a pneumatic tire with a wide groove such as central wide circumferential groove, more particularly to a small rib arrangement in the wide groove being capable of preventing occurrence of bareness of tread rubber in the groove bottom.

Figure 10:
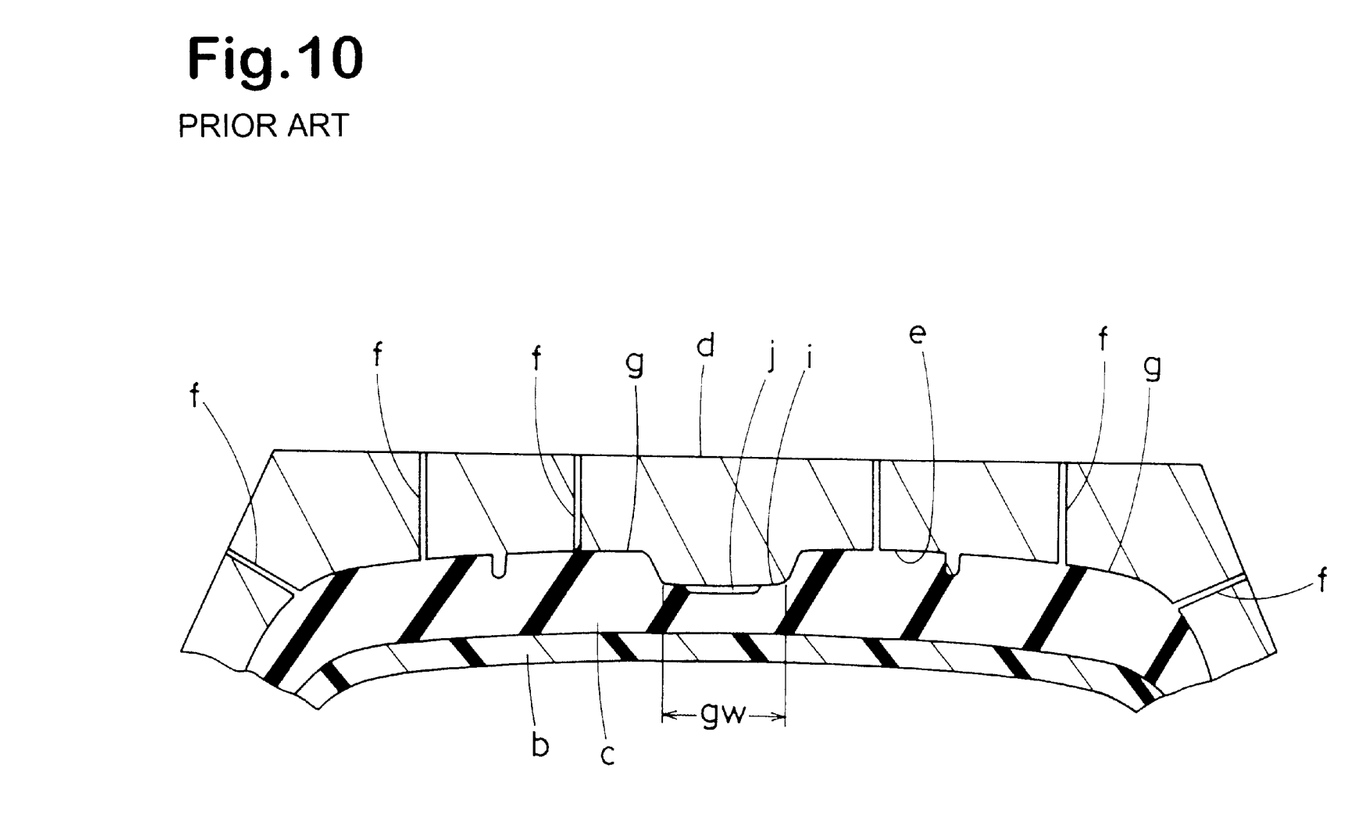
FIG. 10 is a cross sectional view for explaining bareness of tread rubber in the groove bottom of a wide circumferential groove.

In general, a tire mold (d) in which pneumatic tires are vulcanized is, as shown in FIG. 10, provided with vent holes (f) to remove air between the mold (d) and the tire (c). If air is not fully removed, so called bareness of rubber occurs. Due to the vent holes (f), spues or pips of rubber are inevitably formed on the vulcanized tire. Usually the spues are cut off before shipping. If spues are formed in tread grooves, it is hard to cut off the spues. Therefore, vent holes (f) usually avoid the groove wall and bottom.

In recent years, on the other hand, a wide circumferential groove (i) disposed in the tread center is employed even in relatively small size tires such as passenger car tires in order to improve wet performance especially antiaquaplaning performance, running noise and the like. In such case, bareness (j) of tread rubber is liable occur in the bottom of the wide circumferential groove (i).

It is therefore, an object of the present invention to provide a pneumatic tire with a wide groove, in which bareness of tread rubber in the groove bottom is effectively prevented.

According to one aspect of the present invention, a pneumatic tire comprises a wide groove having a bottom width of not less than 20 mm disposed in a tread portion, the wide groove provided on the groove bottom with at least one longitudinal rib extending in the longitudinal direction of the wide groove, and lateral ribs extending from the longitudinal rib towards a tread face through the groove bottom and a groove wall of the wide groove.

Embodiments of the present invention will now be described in detail in conjunction with the accompanying drawings.

A pneumatic tire according to the present invention comprises a tread portion 2, a pair of axially spaced bead portions and a pair of sidewall portions, and the tire is reinforced with a carcass extending between the bead portions and a belt disposed in the tread portion. The tread portion 2 is provided with at least one wide groove 3. In this embodiment, the wide groove 3 is a circumferentially continuously extending groove.

Wide Groove

Figure 3:
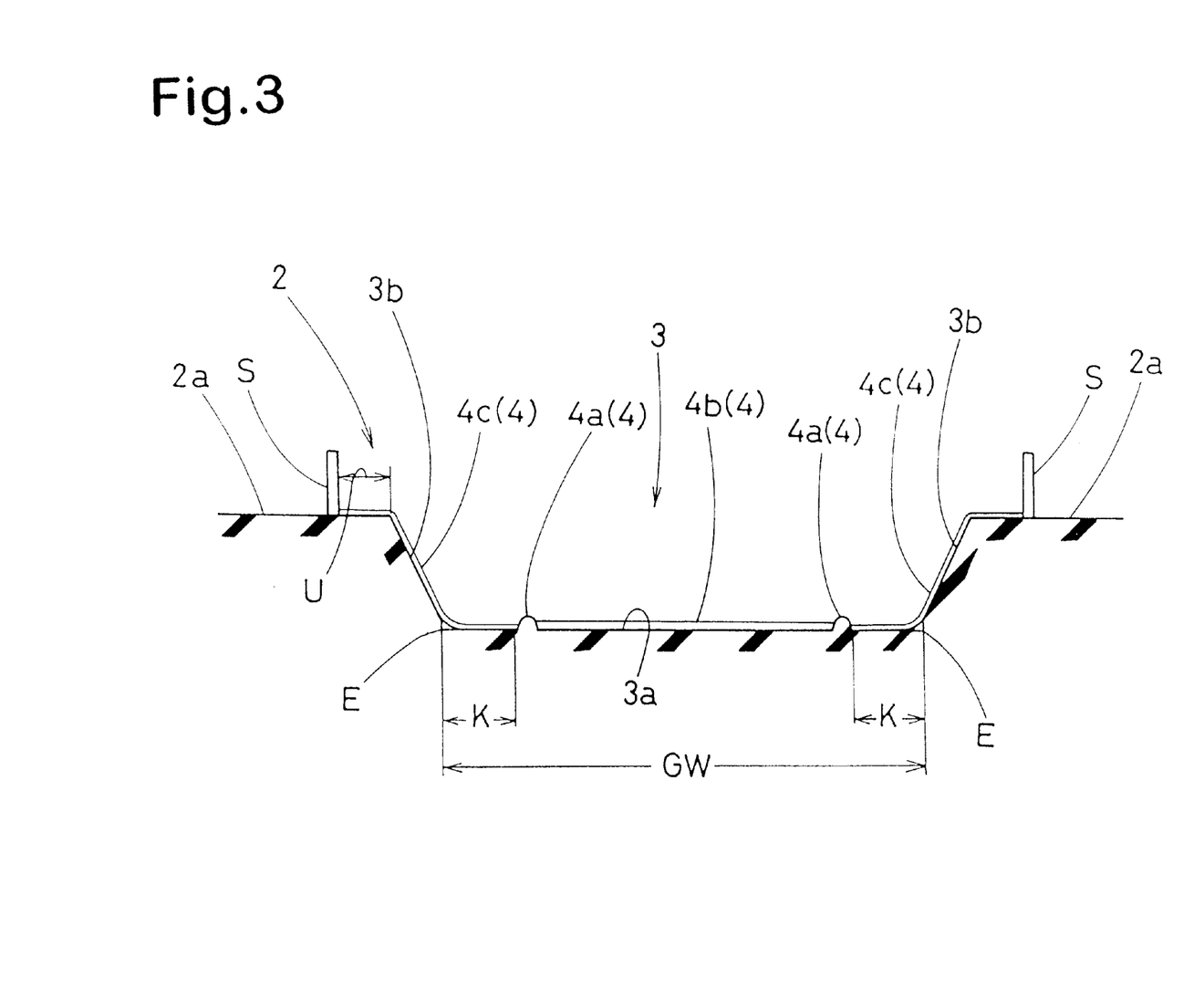
FIG. 3 is an enlarged sectional view of the wide groove taken along a line A—A of FIG. 1.

The wide groove 3 has a bottom width GW of not less than 20 mm, preferably not less than 22 mm. Usually, the corner between the groove bottom 3a and the groove wall 3b is rounded as shown in FIG. 3. In this case, the width can be defined as measured from an intersection (hereinafter bottom edge E) of an extension of the groove bottom 3a and an extension of the groove wall 3b. On the other hand, the top width of the wide groove 3 is preferably not less than 35 mm. The above-mentioned grove widths are measured at a right angle to the longitudinal direction of the wide groove 3.

The depth of the wide groove 3 is preferably set in the range of from 3 to 6% of the tread width.

Figure 1:
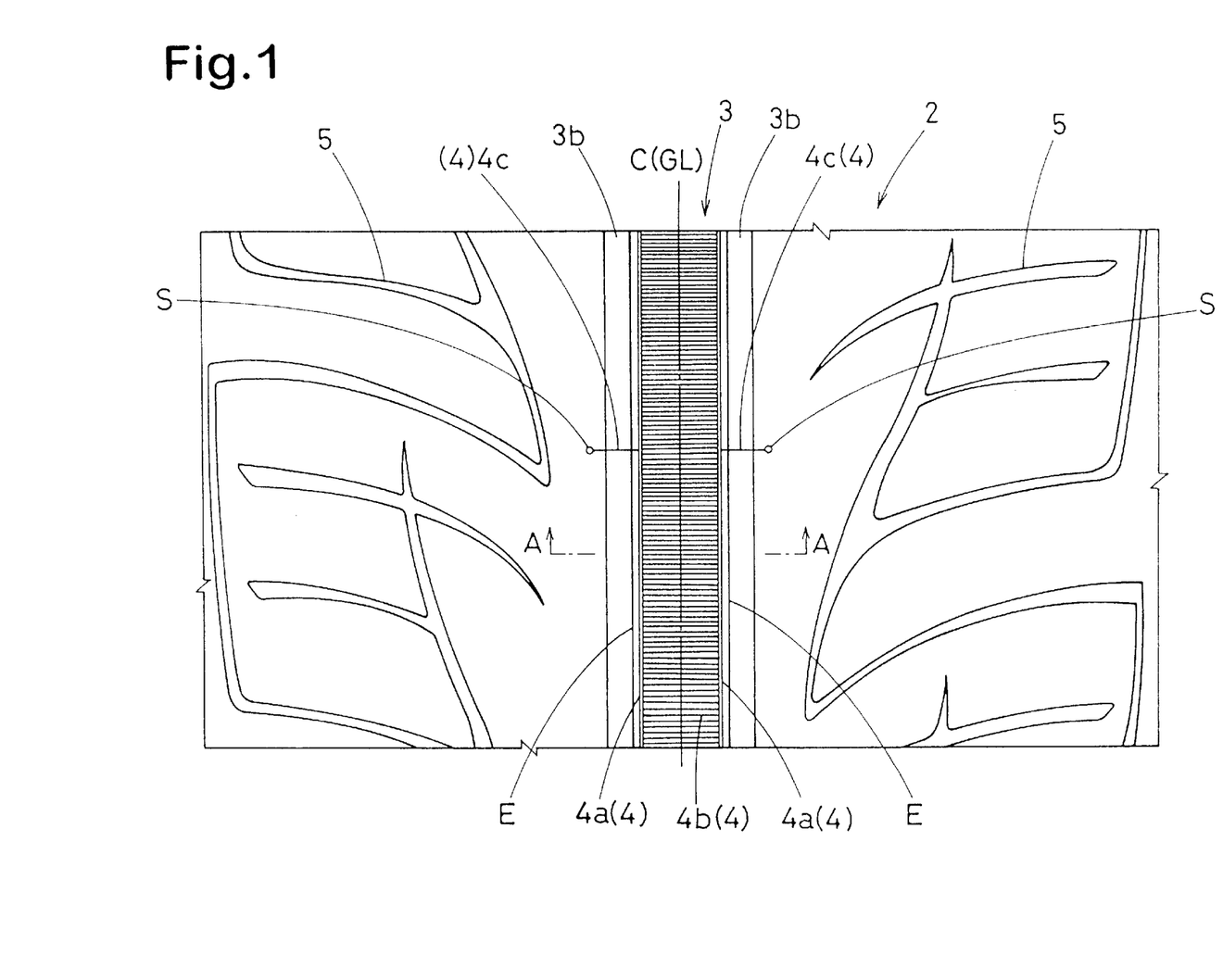
FIG. 1 is a developed plan view of a pneumatic tire according to the present invention.

In FIG. 1 showing an example of the tread pattern, the tread portion 2 is provided in the center thereof with a single wide circumferential groove 3 which is straight and centered on the tire equator C. This groove 3 is the only groove extending continuously in the tire circumferential direction. Further, the tread portion 2 is provided on each side of the wide circumferential groove 3 with lateral grooves 5. In this example, the lateral grooves 5 constitute a plurality of groove sets, each set comprising an less-inclined oblique groove inclined at an angle of not more than 30 degrees with respect to the circumferential direction of the tire, and a plurality of more-inclined oblique grooves which are inclined at an angle of more than 30 degrees with respect to the circumferential direction and join the less-inclined oblique groove. The tread pattern is unidirectional.

In the present invention, however, the wide groove 3 may be a zigzag or wavy groove, and two or more wide grooves 3 may be disposed in the tread portion 2.

The wide groove 3 is provided with at least one longitudinal rib 4a and a plurality of lateral ribs 4c. The longitudinal rib 4a is disposed on the groove bottom and extends along the longitudinal direction of the groove. The lateral ribs 4c extend from the longitudinal rib 4a towards the outside of the wide groove.

Figure 2:
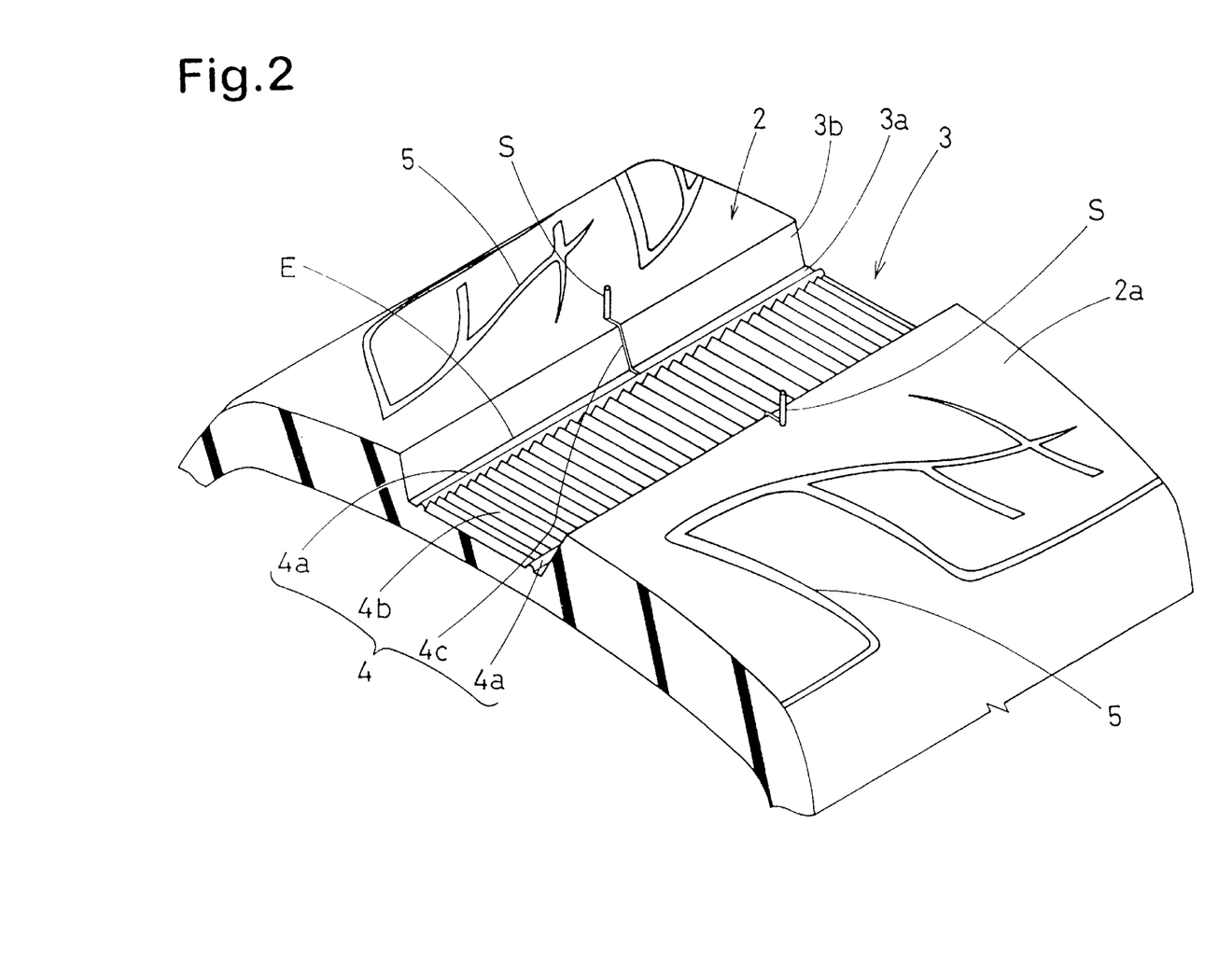
FIG. 2 is a perspective view of the tread portion thereof wherein spues remain in the tread surface.

In an example of the wide circumferential groove 3 shown in FIGS. 1–3, as the groove is relatively wide, two longitudinal ribs 4a are provided and intermediate ribs 4b are further provided between them in addition to the lateral ribs 4c.

Longitudinal Rib

The longitudinal ribs 4a extend continuously in the longitudinal direction of the wide groove 3 or the tire circumferential direction in this example, in parallel with each other. Each longitudinal rib 4a is disposed at a small distance K from one of the bottom edges E towards the groove center GL. The distance K is preferably set in the range of from 2 to 8 mm. The height h1 of the longitudinal rib 4a is preferably set in the range of from 0.2 to 1.5 mm, more preferably 0.3 to 0.8 mm from the groove bottom face 3a. The width W1 of the longitudinal rib 4a is preferably set in the range of from 0.4 to 3.0 mm, more preferably 0.6 to 1.6 mm.

When the distance K is more than 8 mm, bareness of rubber is liable to occur in a groove bottom part between the longitudinal rib 4a and the groove wall 3b. When the distance K is less than 2 mm, bareness of rubber is liable to occur in the groove center if the intermediate ribs are not provided. When the height h1 of the longitudinal rib 4a is less than 0.2 mm, it is difficult to remove air from the groove bottom and bareness of rubber occurs. When the height h1 is more than 1.5 mm, there is a possibility that pass-by noise increases.

Figure 4:
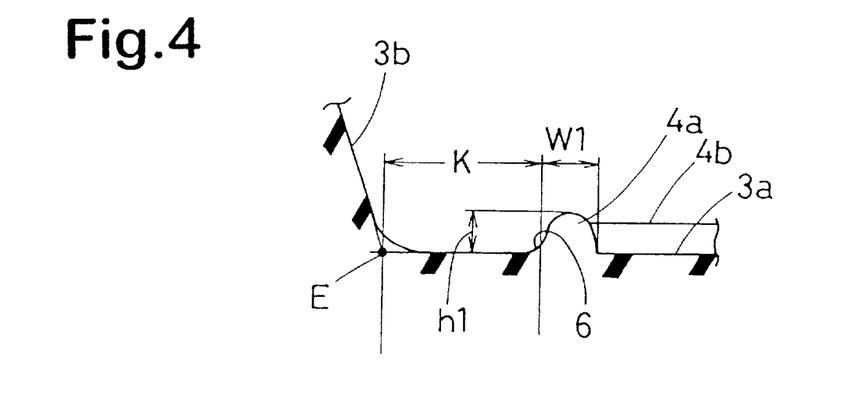
FIG. 4 is a cross sectional view of the longitudinal rib.

In this example, as shown in FIG. 4, the sectional shape of the longitudinal rib 4a is a semicircle.

In order to fully prevent the bareness of rubber in a groove bottom part between the longitudinal rib 4a and groove wall 3b, it is preferable that the corner 6 between the longitudinal rib 4a and the bottom face 3a is rounded by a single radius arc or a multi-radius arc of which radius of curvature gradually decreases towards the longitudinal rib 4a. For the same reason, it is preferable that the corner (E) between the bottom face 3a and the groove wall 3b is rounded by a single radius arc or a multi-radius arc of which radius of curvature gradually decreases towards the groove wall 3b.

Intermediate Rib

The intermediate ribs 4b are a large number of lateral ribs each extending from one of the longitudinal ribs 4a towards the other. The height h2 of the intermediate ribs 4b is preferably set in the range of from 0.2 to 1.5 mm, more preferably 0.2 to 0.8 mm from the groove bottom face 3a. The height h2 is not more than height h1, preferably less than the height h1. The width W2 of the intermediate ribs 4b is preferably set in the range of from 0.8 to 3 mm.

The intermediate ribs 4b are arranged at pitches P of 0.8 to 3 mm in the longitudinal direction of the wide groove. Preferably, the pitches P are substantially constant.

In a plan view, the intermediate ribs 4b are inclined at an angle θ of not less than 30 degrees, preferably not less than 45 degrees, more preferably substantially 90 degrees with respect to the longitudinal direction of the wide groove.

Figure 5:
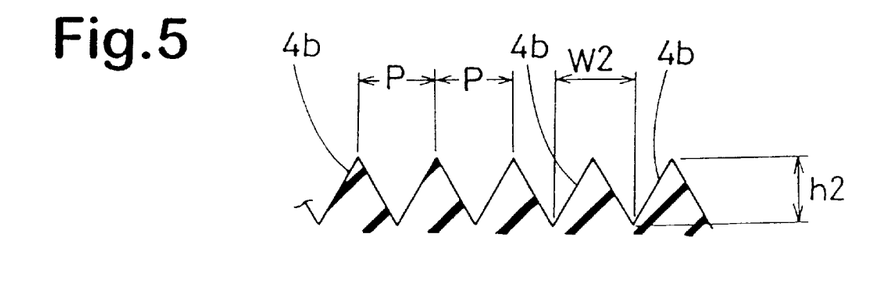
FIG. 5 is a cross sectional view of the intermediate rib.

In this example, as shown in FIG. 5, the sectional shape of the intermediate rib 4b is a triangle. The pitches P are equal to the width W2.

Figure 7A:
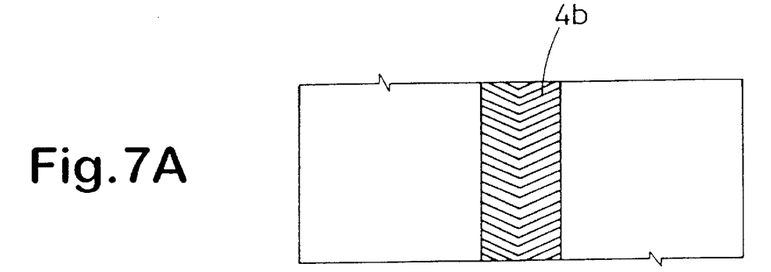
FIGS. 7A, 7B, 7C and 7D are schematic plan views each showing another example of the intermediate rib arrangement.
Figure 7B:
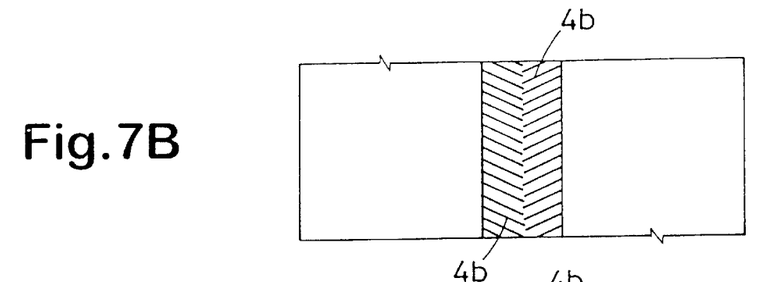
Figure 7C:
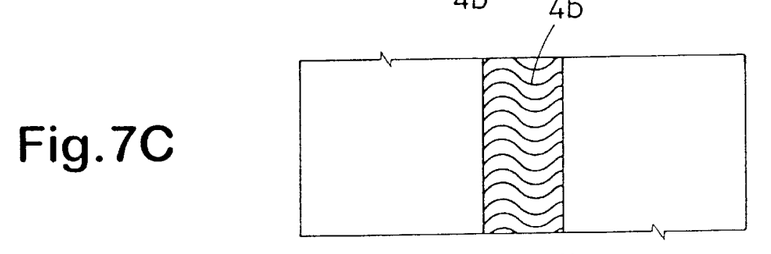
Figure 7D:
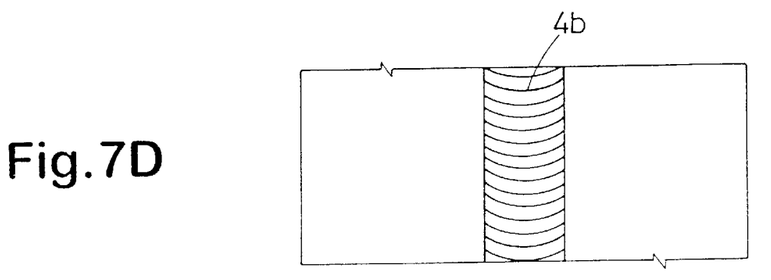

In the example shown in FIGS. 1 and 2, the intermediate ribs 4b extend straight from one of the longitudinal ribs 4a to the other and are arranged in a parallel formation. But, as shown in FIGS. 7A–7D, various shapes and formation may be employed. In FIG. 7A showing V-shaped ribs in a parallel formation, the V-shaped intermediate ribs 4b extend from one of the longitudinal ribs 4a to the other. In FIG. 7B showing half-length straight ribs in a staggered V-formation, the intermediate ribs 4b extend straight from the longitudinal ribs 4a to the groove center line and they are staggered on the groove center line. In FIG. 7C showing zigzag or wavy ribs in a parallel formation, the zigzag intermediate ribs 4b extend from one of the longitudinal ribs 4a to the other. In FIG. 7D showing U-shaped or arced ribs in a parallel formation, the U-shaped intermediate ribs 4b extend from one of the longitudinal ribs 4a to the other.

Lateral Rib

The lateral ribs 4c extend from the longitudinal ribs 4a towards the opposite direction to the groove center GL through the groove bottom 3a and groove wall 3b into the tread surface 2a, more specifically extends to spues S or pips of rubber or vestiges thereof on the tread surface 2a positioned at a distance U of 2 to 10 mm preferably 2 to 5 mm from the edges of the wide circumferential groove 3.

The height h3 of the lateral rib 4c is preferably set in the range of from 0.2 to 0.8 mm. The width W3 of the lateral rib 4c is preferably set in the range of from 0.4 to 1.6 mm.

Figure 6:
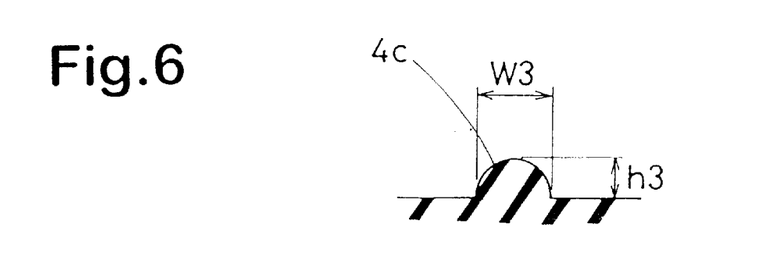
FIG. 6 is a cross sectional view of the lateral rib.

In this example, as shown in FIG. 6, the sectional shape of the lateral rib 4c is a semicircle.

Tire Mold

The above-mentioned various ribs 4a, 4b and 4c are molded by a tire mold M together with the wide circumferential groove 3, lateral grooves 5, and the like.

Figure 8:
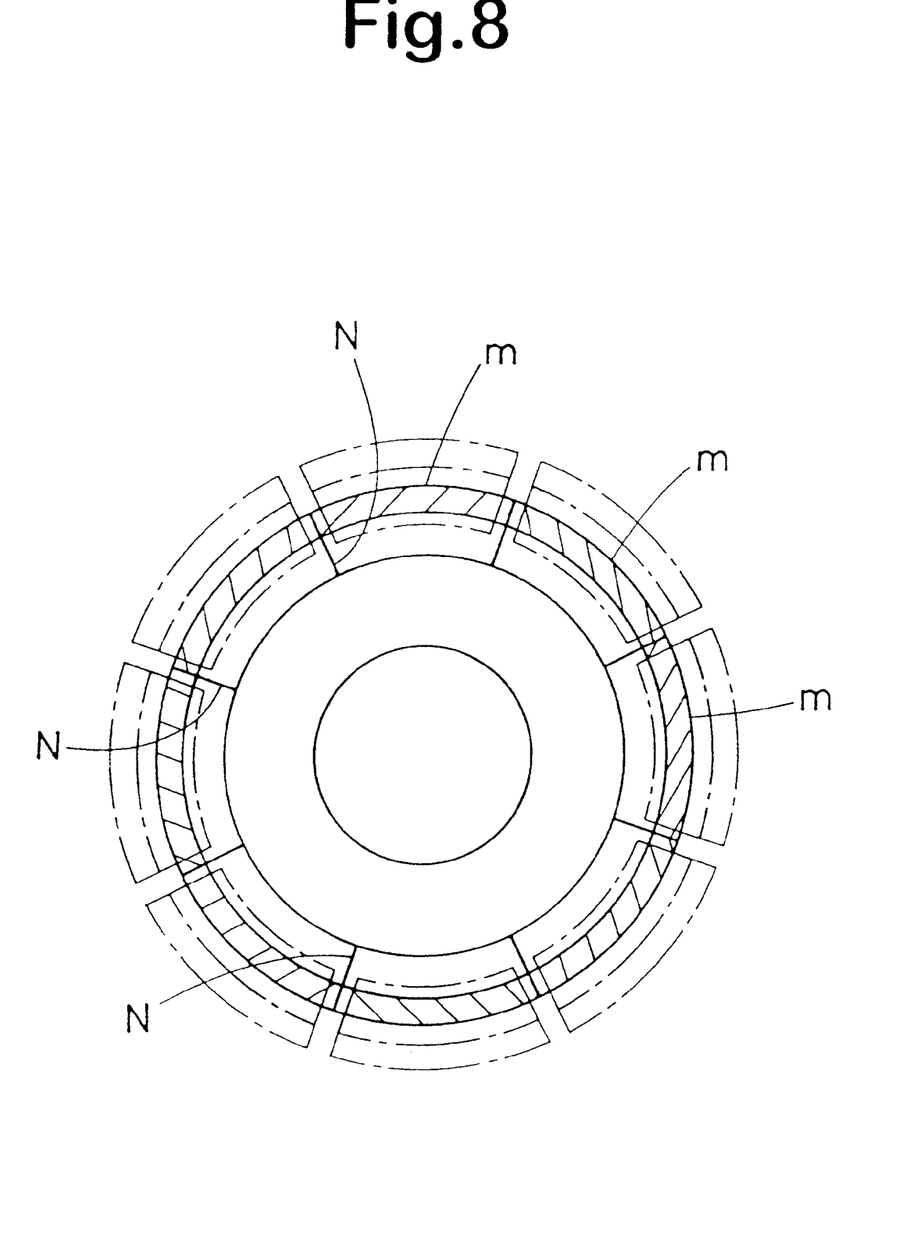
FIG. 8 is a diagram for explaining a tire mold.

For example, as schematically shown in FIG. 8, the tire mold M is a segmental mold comprising a plurality of circumferentially divided, radially movable sectors (m) for forming the tread portion 2. When the sectors (m) are at their radially innermost positions, the inner surfaces thereof collectively form a circumferentially continuously extending tread-forming face M2.

Figure 9:
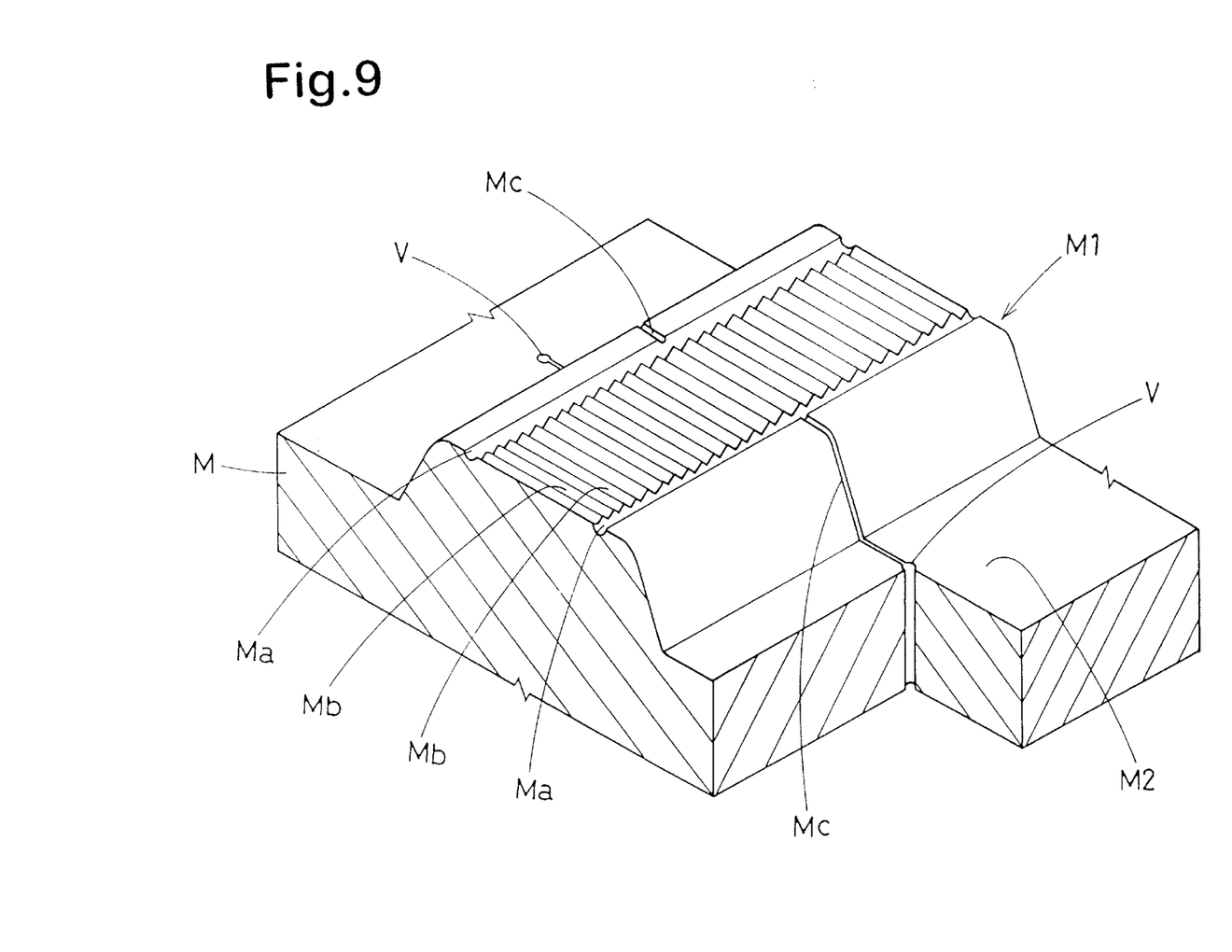
FIG. 9 is a partial perspective view of the tire mold showing a part corresponding with the wide groove shown in FIG. 2.

FIG. 9 shows a part of the tread-forming face M2, which is provided with: a rib M1 for forming the wide circumferential groove 3 (hereinafter circumferential-groove-forming rib M1); grooves Ma for forming the longitudinal ribs 4a (hereinafter longitudinal-rib-forming grooves Ma); grooves Mb for forming the intermediate ribs 4b (hereinafter intermediate-rib-forming grooves Mb); and grooves Mc for forming the lateral ribs 4c (hereinafter lateral-rib-forming grooves Mc). The sizes and shapes of the rib M1 and grooves Ma, Mb and Mc correspond to those of the wide groove 3 and ribs 4a, 4b and 4c. Thus a detailed description is omitted.

The tread-forming face M2 is further provided with vent holes V in a face for forming the tread surface 2a (hereinafter tread-surface-forming face). The vent holes V are positioned at a distance (U) of from 2 to 10 mm preferably 2 to 5 mm from the edges of the wide circumferential groove 3 as shown in FIG. 13.

Each of the lateral-rib-forming groove Mc extends from one of the longitudinal-rib-forming grooves Ma to one of the vent holes V.

In this example, each sector (m) is provided with at least one lateral-rib-forming groove Mc, preferably at least two lateral-rib-forming grooves Mc one on each side of the circumferential-groove-forming rib M1.

Therefor, air between the mold and the tire can be easily discharged through the grooves Ma, Mb and Mc and vent holes V.

In the tread surface 2a, by the vent holes and lateral-rib-forming groove Mc, there are formed spues S of rubber and part of the lateral ribs 4c, which part may be removed from the tread surface together with the spues S.

Comparison Tests

Test tires of size 245/45ZR16 having the tread portion shown in FIGS. 1 to 3 and specifications shown in Table 1 were made and tested for occurrence of bareness, pass-by noise and antiaquaplaning performance.

Bareness Test

As to each test tire, a hundred test products were made and checked if bareness of rubber occurred in the groove bottom of the wide circumferential groove. The test results are indicated by an index based on Reference tire being 100. The smaller the value, the lesser the bareness.

Pass-by Noise Test

According to JASO C-606, a test car (3000 cc FR passenger car) provided on all the wheels with test tires was coasted on a smooth asphalt road at a speed of 53 km/h for a distance of 50 meters, and in the middle of the course, the maximum level in dB(A) of the pass-by noise was measured with a microphone fixed at a position 7.5 meter sideways from the center line of the running course and 1.2 meter height from the road surface. The tires were mounted on a standard rim of size 8JJX16 and inflated to an inner pressure of 200 kPa. The test results are indicated by an index based on Reference tire being 100. The smaller the value, the lower the noise level.

Antiaquaplaning Performance Test

The test car was run on a 100 m radius asphalt course provided with a 5 mm depth 20 m length water pool, and changing the entering speed, the lateral acceleration (lateral G) was measured on the front wheels to obtain the average lateral G from 50 to 80 km/h. The test results are indicated by an index based on Reference tire being 100. The larger the value, the better the performance.

TABLE 1

| Tire | Ref. | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Wide groove | | | | | | | | | | | | |
| Top width | | | | | | 35 mm | | | | | | |
| Bottom width | | | | | | 25 mm | | | | | | |
| Depth | | | | | | 8.4 mm | | | | | | |
| Longitudinal rib | | | | | | | | | | | | |
| Height h1 (mm) | — | 0.5 | 0.5 | 0.5 | 0.5 | 0.2 | 0.5 | 0.5 | 0.3 | 0.5 | 1.5 | 0.8 |
| Width w1 (mm) | — | 1 | 1 | 1 | 1 | 0.4 | 1 | 1 | 0.6 | 1 | 3 | 3 |
| Distance k (mm) | — | 3 | 3 | 10 | 1 | 3 | 8 | 2 | 3 | 3 | 3 | 3 |
| Shape (FIG. No.) | — | 4 | 4 | 4 | 4 | 4 | 4 | 4 | 4 | 4 | 4 | 4 |
| Intermediate rib | | | | | | | | | | | | |
| Height h2 (mm) | — | 0.3 | — | 0.3 | 0.3 | 0.3 | 0.3 | 0.2 | 0.3 | 0.3 | 0.8 | 0.8 |
| Width w2 (mm) | — | 0.6 | — | 0.6 | 0.6 | 0.6 | 0.6 | 0.4 | 0.6 | 0.6 | 3 | 1.6 |
| Pitch p (mm) | — | 1 | — | 1 | 1 | 1 | 2 | 2 | 1 | 1 | 1 | 1 |
| Angle θ (deg) | — | 45 | — | 45 | 45 | 30 | 45 | 90 | 45 | 45 | 45 | 45 |
| Shape (FIG. No.) | — | 5 | — | 5 | 5 | 5 | 5 | 5 | 5 | 5 | 5 | 5 |
| Formation (FIG. No.) | — | 7A | — | 7A | 7A | 7A | 7A | 7D | 7A | 7A | 7A | 7A |
| Lateral rib | | | | | | | | | | | | |
| Height h3 (mm) | — | — | 0.5 | 0.5 | 0.2 | 0.5 | 0.5 | 0.5 | 0.5 | 0.5 | 0.8 | 0.5 |
| Width w3 (mm) | — | — | 1 | 1 | 0.4 | 1 | 1 | 0.4 | 1 | 1 | 1.6 | 1 |
| Number | — | — | 9 | 9 | 9 | 9 | 9 | 9 | 9 | 9 | 9 | 9 |
| Shape (FIG. No.) | — | — | 6 | 6 | 6 | 6 | 6 | 6 | 6 | 6 | 6 | 6 |
| Test Results | | | | | | | | | | | | |
| Occurrence of Bareness (%) | 100 | 85 | 80 | 90 | 80 | 30 | 20 | 20 | 15 | 10 | 5 | 5 |
| Pass-by noise (index) | 100 | 100 | 100 | 100 | 100 | 100 | 100 | 100 | 100 | 100 | 95 | 95 |
| Antiaquaplaning (index) | 100 | 100 | 100 | 100 | 100 | 100 | 100 | 100 | 100 | 100 | 95 | 100 |

It was confirmed from the tests that, in the tires according to the invention, the occurrence of bareness can be effectively controlled without deteriorating the antiaquaplaning performance and noise performance.

The present invention suitably applied to radial tires for passenger cars, but it is also possible to apply to various pneumatic tires. Further, the longitudinal ribs, intermediate ribs and lateral ribs may be formed in various cross-sectional shapes in addition to the semicircle and triangle.

What is claimed is:

1. A pneumatic tire comprising
   a wide groove having a bottom width of not less than 20 mm and disposed in a tread portion,
   the wide groove provided with two longitudinal ribs, intermediate ribs and lateral ribs,
   said two longitudinal ribs each extending in the longitudinal direction of the wide groove and each disposed on the groove bottom of said wide groove at a distance of from 2 to 8 mm from one of edges of the groove bottom towards the center of the wide groove, the two longitudinal ribs each having a height of 0.2 to 1.5 mm,
   said intermediate ribs disposed on the groove bottom between the two longitudinal ribs and each extending from one of the two longitudinal ribs towards the other, the intermediate ribs each having a height of 0.2 to 1.5 mm,
   said lateral ribs each extending from one of the two longitudinal ribs towards a tread face through the groove bottom and a groove wall of the wide groove.

2. The pneumatic tire according to claim 1, wherein the lateral ribs. extend-into the tread face.

3. The pneumatic tire according to claim 1, wherein the lateral ribs extend to spues formed in the tread face or vestiges thereof.

4. The pneumatic tire according to claim 1, wherein said intermediate ribs are straight or V-shaped or U-shaped and are arranged in a parallel formation.

5. The pneumatic tire according to claim 4, wherein an inclination angle of each said intermediate rib is not less than 30 degrees with respect to the longitudinal direction of the wide groove.

6. The pneumatic tire according to claim 1, wherein said intermediate ribs are straight and are arranged in a staggered V-formation.

7. A pneumatic tire according to claim 6, wherein, each said intermediate rib extends from one of the two longitudinal ribs to the center of the groove.

8. The pneumatic tire according to claim 6, wherein an inclination angle of each said intermediate rib is not less than 30 degrees with respect to the longitudinal direction of the wide groove.

9. The pneumatic tire according to claim 1, wherein an inclination angle of each said intermediate rib is not less than 30 degrees a with respect to the longitudinal direction of the wide groove.

10. The pneumatic tire according to claim 1, wherein each lateral rib has a height of 0.2 to 0.8 mm and a width of 0.4 to 1.6 mm.

11. The pneumatic tire according to claim 1, wherein each intermediate rib has a width of 0.8 to 3 mm and each longitudinal rib has a width of 0.4 to 3.0 mm.

12. The pneumatic tire according to claim 1, wherein each of the longitudinal ribs and lateral ribs has a rounded sectional shape, and each of the intermediate ribs has a triangular sectional shape.

13. The pneumatic tire according to claim 1, wherein the height of the intermediate ribs is not more than the height of the two longitudinal ribs.

14. The pneumatic tire according to claim 1, wherein the height of the intermediate ribs is less than the height of the two longitudinal ribs.

* * * * *